(No Model.)
E. B. LAKE.
BALL BEARING.
No. 366,117. Patented July 5, 1887.
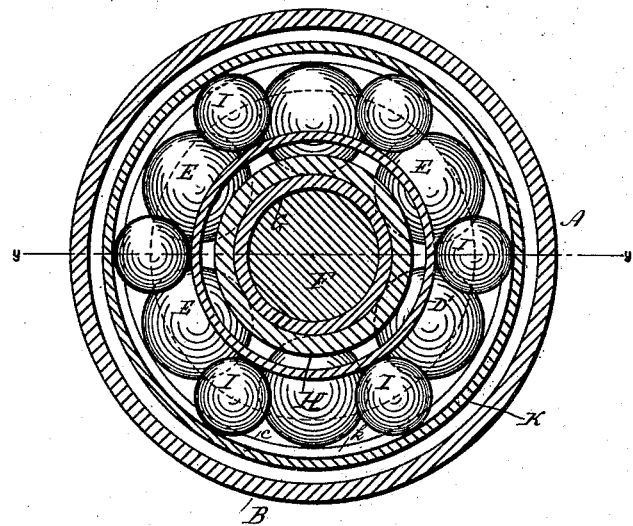
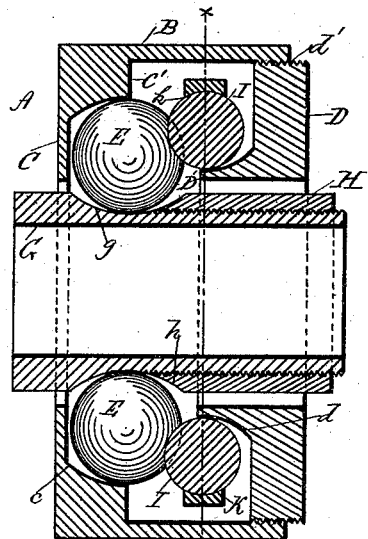
WITNESSES
Will B. H. Powell.
Chas. B. Connolly.
INVENTOR
Ezra B. Lake,
By Connolly Bro
Attorneys

UNITED STATES PATENT OFFICE.

EZRA B. LAKE, OF CAMDEN, NEW JERSEY.

BALL-BEARING.

SPECIFICATION forming part of Letters Patent No. 366,117, dated July 5, 1887.

Application filed October 7, 1886. Serial No. 215,574. (No model.)

*To all whom it may concern:*

Be it known that I, EZRA B. LAKE, a citizen of the United States, residing at Camden, in the county of Camden and State of New Jersey, have invented certain new and useful Improvements in Ball-Bearings; and I do hereby declare the following to be a full, clear, and exact description of the invention, reference being had to the accompanying drawings, which form part of this specification, in which—

Figure 1 is a vertical section of a bearing embodying my invention. Fig. 2 is a vertical transverse section of the same on line $x$ $x$ of Fig. 1.

My improvements have reference to anti-friction bearings for shafts, spindles, axles, &c., and have for their object to provide a construction in which balls, as distinguished from cylinders or rollers, are employed as the bearings, said bearing-balls being kept separated by other balls, and provision being made for taking up or compensating for looseness of fit and lost motion in the parts.

My invention consists in the peculiar and novel construction and combinations of parts, as hereinafter described and specifically explained.

Referring to the accompanying drawings, A designates a case or box comprising the side B, which is preferably cylindrical, as shown, and the heads or ends C and D.

If desired, the head C and the side B may be integral or made in one piece, and they are so shown in the drawings.

The head D is fitted in the side B by a screw-joint, $d'$, and is adjustable relatively to the head C—that is, may be moved toward and from the latter. The head C is formed with an offset or annular shoulder, $C'$, having a curved side, $c$, and the head D is formed with an annular flange, $D'$, having a curved side, $d$.

E E represent the balls on which the shaft F obtains its bearings. Said shaft may contact directly with said balls; but the former is preferably provided with a skein or sleeve, G, tightly fitted on and revolving with it. The skein G has an annular groove, $g$, one side of which is formed by the curved end $h$ of the threaded adjustable part or thimble H, and in this groove the balls E E revolve or travel, bearing on their opposite sides against or being kept in contact with the shaft by the offset or shoulder $C'$, the curved side of which, $c$, forms a way for said balls.

I I are separator-balls, which prevent contact of the balls E E with each other. Said separator-balls alternate with the bearing-balls and present revolving surfaces to the latter, the curved side $d$ presenting a way on which said separator-balls travel. The latter are kept in position by an encircling ring, K, the inner side of which is concave or channeled, as shown at $k$. This ring is loose—that is, not fixedly attached to any part—and it revolves with the balls I around the shaft F.

By screwing or turning the head D into the side B, or the latter on the former, the bearing-balls and separating-balls may be relatively adjusted toward each other to insure a proper fit and to take up lost motion, and by turning in or screwing on the thimble H any looseness of fit or lost motion of the balls E E may be also corrected.

I am aware that anti-friction bearings have been already produced in which the rolling surfaces are composed of balls. I am also aware that bearings have been provided containing bearing-rollers, separating-rollers, and rings, and Letters Patent of the United States, dated December 8, 1885, No. 332,091, have been granted to me exhibiting the same; but with bearing-rollers there is end-thrust, which produces some friction that it is desirable and difficult to avoid.

By substituting balls for rollers such end-thrust is avoided and the friction resulting therefrom overcome. My improvements herein described are therefore to be understood as particularly referring to ball-bearings as distinguished from roller-bearings.

What I claim as my invention is as follows:

1. In an anti-friction bearing, the combination, with a case and a shaft, spindle, or axle, of balls which afford bearings for said shaft, spindle, or axle, separating-balls which alternate with said bearing-balls, a ring, K, which encircles said separating-balls, and an inner stationary way upon which said separating-balls ride, substantially as shown and described.

2. In an anti-friction bearing, the combination, with a containing-case, A, of balls E E, which afford rolling bearings for a central shaft, spindle, or axle, F, separating-balls I I, which alternate with the bearing-balls, a loose ring, K, having its inner side grooved and encircling the separating-balls, and an inner stationary way upon which said separating-balls ride, substantially as shown and described, and for the purpose set forth.

3. In an anti-friction bearing comprising a case, bearing-balls, and separating-balls, the combination, with the said case and said balls, of a laterally-movable head or end, D, whereby the bearing and separating balls may be relatively adjusted, substantially as shown and described.

4. In a ball-bearing, the combination, with the balls E and I, of the case A, with heads C and D, having, respectively, the ways $c$ and $d$ for said balls, substantially as shown and described.

5. In combination with a case, A, having bearing-balls E and a shaft, F, a skein or sleeve, G, having an adjustable part or thimble, H, substantially as shown and described.

In testimony that I claim the foregoing I have hereunto set my hand this 24th day of September, 1886.

EZRA B. LAKE.

Witnesses:
WILL H. POWELL,
R. DALE SPARHAWK.